United States Patent
Kwak et al.

(10) Patent No.: US 10,869,282 B2
(45) Date of Patent: Dec. 15, 2020

(54) METHOD FOR TRANSMITTING UPLINK CONTROL CHANNEL IN WIRELESS COMMUNICATION SYSTEM, AND DEVICE THEREFOR

(71) Applicant: LG ELECTRONICS INC., Seoul (KR)

(72) Inventors: Kyuhwan Kwak, Seoul (KR); Kijun Kim, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 28 days.

(21) Appl. No.: 16/306,803

(22) PCT Filed: Jun. 2, 2017

(86) PCT No.: PCT/KR2017/005768
§ 371 (c)(1),
(2) Date: Dec. 3, 2018

(87) PCT Pub. No.: WO2017/209555
PCT Pub. Date: Dec. 7, 2017

(65) Prior Publication Data
US 2019/0296879 A1 Sep. 26, 2019

Related U.S. Application Data

(60) Provisional application No. 62/344,995, filed on Jun. 3, 2016.

(51) Int. Cl.
*H04W 52/32* (2009.01)
*H04L 5/00* (2006.01)
*H04L 27/20* (2006.01)

(52) U.S. Cl.
CPC .......... *H04W 52/325* (2013.01); *H04L 5/00* (2013.01); *H04L 5/0055* (2013.01); *H04L 27/20* (2013.01)

(58) Field of Classification Search
CPC .................................................. H04W 52/325
See application file for complete search history.

(56) References Cited

U.S. PATENT DOCUMENTS

| 2012/0155414 A1 | 6/2012 | Noh et al. | |
| 2012/0207119 A1* | 8/2012 | Zhang | H04L 5/0051 370/329 |

(Continued)

FOREIGN PATENT DOCUMENTS

EP  2999282  3/2016

OTHER PUBLICATIONS

PCT International Application No. PCT/KR2017/005768, International Search Report dated Sep. 14, 2017, 3 pages.

*Primary Examiner* — Jason E Mattis
(74) *Attorney, Agent, or Firm* — Lee Hong Degerman Kang Waimey

(57) ABSTRACT

Disclosed is a method for transmitting an uplink control channel and a device therefor. Specifically, a method for transmitting an uplink control channel in a wireless communication system by a terminal, includes: generating at least one modulation symbol for specific uplink control information; mapping the at least one modulation symbol to a first resource region of the uplink control channel; and transmitting the uplink control channel to a base station, in which the uplink control channel may include the first resource region and a second resource region to which a reference signal is mapped, and an energy value allocated to the first resource region may be configured to be the same as an energy value allocated to the second resource region.

14 Claims, 11 Drawing Sheets

(56) References Cited

U.S. PATENT DOCUMENTS

| | | |
|---|---|---|
| 2012/0213187 A1 | 8/2012 | Yang et al. |
| 2012/0238310 A1 | 9/2012 | Xiao et al. |
| 2013/0230017 A1* | 9/2013 | Papasakellariou ........................ H04W 72/0406 370/330 |
| 2014/0219199 A1* | 8/2014 | Ji ..................... H04W 88/08 370/329 |
| 2014/0348078 A1* | 11/2014 | Kim .................. H04W 52/146 370/329 |
| 2015/0092702 A1* | 4/2015 | Chen .................. H04W 72/082 370/329 |
| 2015/0156764 A1* | 6/2015 | Yang .................... H04L 1/0076 370/329 |
| 2016/0100398 A1* | 4/2016 | Xia ...................... H04L 5/0053 370/330 |
| 2016/0227521 A1* | 8/2016 | Han ...................... H04L 5/0051 |
| 2018/0139014 A1* | 5/2018 | Xiong ............... H04W 72/0453 |
| 2019/0140878 A1* | 5/2019 | Takeda ................ H04L 27/2607 |

* cited by examiner

METHOD FOR TRANSMITTING UPLINK CONTROL CHANNEL IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2017/005768, filed on Jun. 2, 2017, which claims the benefit of U.S. Provisional Application No. 62/344,995, filed on Jun. 3, 2016, the contents of which are all hereby incorporated by reference herein in their entirety.

TECHNICAL FIELD

The present invention relates to a wireless communication system, and more particularly, to a method for transmitting an uplink control channel and a device for supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

An embodiment of the present invention provides a method for mapping uplink control information to an uplink control channel in a wireless communication system.

More specifically, an embodiment of the present invention provides a method for mapping the uplink control information according to an energy relationship between a reference signal region (that is, resource element to which a reference signal is mapped) of the uplink control channel and a data region (that is, resource element to which the uplink control information is mapped).

Furthermore, an embodiment of the present invention provides a method for mapping the uplink control information to the uplink control channel by using a QPSK modulation scheme or a BPSK modulation scheme.

Technical objects to be achieved by the present invention are not limited to the aforementioned technical objects, and other technical objects not described above may be evidently understood by a person having ordinary skill in the art to which the present invention pertains from the following description

Technical Solution

In an embodiment of the present invention, a method for transmitting an uplink control channel in a wireless communication system by a terminal, includes: generating at least one modulation symbol for specific uplink control information; mapping the at least one modulation symbol to first resource region of the uplink control channel; and transmitting the uplink control channel to a base station, in which the uplink control channel includes the first resource region and second resource region to which a reference signal is mapped, and an energy value allocated to the first resource region is configured to be the same as an energy value allocated to the second resource region.

Furthermore, in an embodiment of the present invention, the at least one modulation symbol may include at least one modulation symbol generated according to quadrature phase shift keying (QPSK) modulation.

Furthermore, in an embodiment of the present invention, the specific uplink control information may be configured with first control information and second control information, and the energy value allocated to the first resource region and the energy value allocated to the second resource region may be determined by considering a chordal distance between a first state and a second state of the specific uplink control information, and the first state and the second state may be determined respectively according to a combination of the first control information and the second control information.

Furthermore, in an embodiment of the present invention, the specific uplink control information may include uplink ACK/NACK information.

Furthermore, in an embodiment of the present invention, the at least one modulation symbol may include at least one modulation symbol generated according to binary phase shift keying (BPSK) modulation.

Furthermore, in an embodiment of the present invention, the at least one modulation symbol may include a first modulation symbol corresponding to a first bit of the specific uplink control information and a second modulation symbol corresponding to a second bit of the specific uplink control information.

Furthermore, in an embodiment of the present invention, the first modulation symbol and the second modulation symbol may be mapped to the first resource region according to any one of localized mapping or distributed mapping.

Furthermore, in an embodiment of the present invention, the method may further include receiving, from the base station, information indicating any one of the localized mapping or the distributed mapping via at least one of higher layer signaling or downlink control information.

Furthermore, in an embodiment of the present invention, the at least one modulation symbol and the reference signal may be multiplied by at least one sequence of a sequence having a length corresponding to the number of first modulation symbols, a sequence having a length corresponding to the number of second modulation symbols, a sequence having a length corresponding to the number of resource elements configuring the second resource region, or a sequence having a length corresponding to the number of resource elements of the uplink control channel.

Furthermore, in an embodiment of the present invention, the at least one sequence may include at least one of a Zadoff-Chu sequence or an orthogonal cover code.

In another embodiment of the present invention, a terminal for transmitting an uplink control channel in a wireless communication system, includes: a transceiving unit for transmitting and receiving a radio signal; and a processor functionally connected to the transceiving unit, in which the processor is configured to generate at least one modulation symbol for specific uplink control information, map the at least one modulation symbol to first resource region of the uplink control channel, and transmit the uplink control channel to a base station, and the uplink control channel includes the first resource region and second resource region to which a reference signal is mapped, and an energy value allocated to the first resource region is configured to be the same as an energy value allocated to the second resource region.

Advantageous Effects

According to an embodiment of the present invention, a chordal distance between states of uplink control information is set as large as possible to enhance detection and/or decoding performance of the uplink control information.

Furthermore, according to an embodiment of the present invention, the detection and/or decoding performance of the uplink control information can be more greatly enhanced by applying different modulation schemes to the same uplink control information.

Furthermore, according to an embodiment of the present invention, optimized energy or power can be allocated in association with the detection and/or decoding performance of the uplink control information with respect to each resource element of an uplink control channel.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompany drawings, which are included to provide a further understanding of the present invention and are incorporated on and constitute a part of this specification illustrate embodiments of the present invention and together with the description serve to explain the principles of the present invention.

MODE FOR INVENTION

Figure 1:
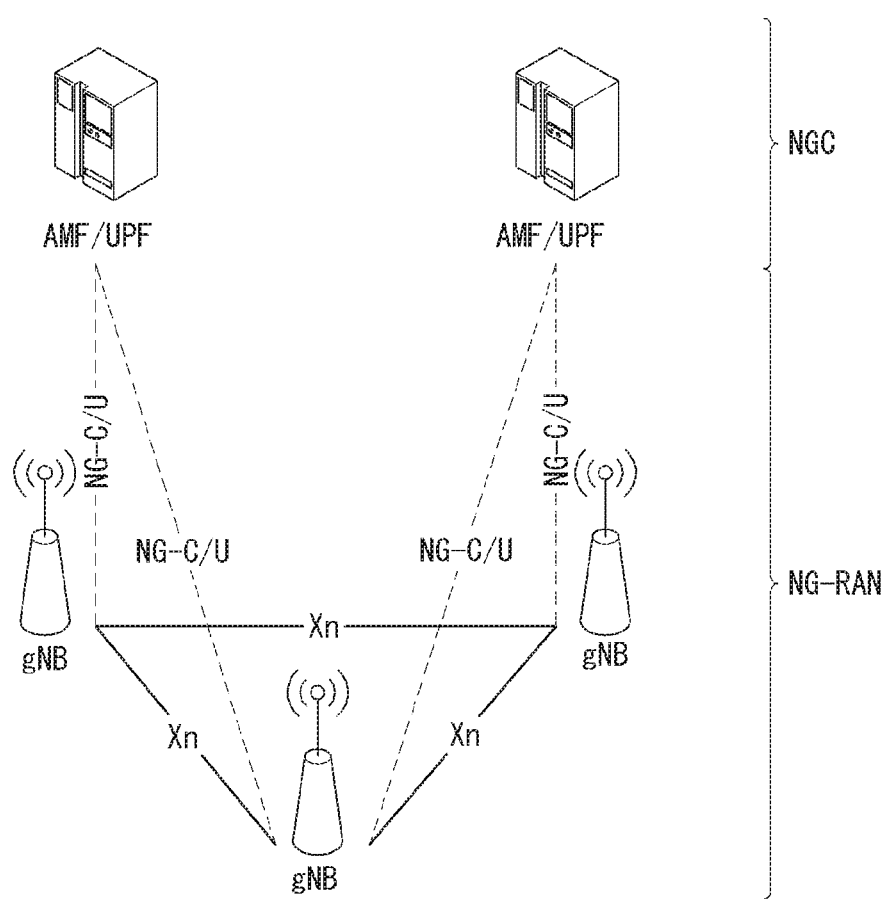
FIG. 1 is a diagram illustrating an example of an overall system structure of new RAT (NR) to which a method proposed by the present invention may be applied.

Hereinafter, preferred embodiments of the present invention will be described in detail with reference to the accompanying drawings. A detailed description to be disclosed below together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as global system for mobile communications (GSM)/general packet radio service (GPRS)/enhanced data rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A/New RAT (NR) is primarily described for clear description, but technical features of the present invention are not limited thereto.

As the supply of smartphones and Internet of Things (IoT) UEs is rapidly spread, the amount of information exchanged over a communication network is explosively increased. Accordingly, in a next-generation radio access technology, an environment (e.g., enhanced mobile broadband communication) that provides users with faster services than the existing communication system (or existing radio access technology) may need to be taken into consideration. To this end, the design of a communication system in which machine type communication (MTC) providing services by connecting multiple devices and objects is also taken into consideration.

Furthermore, the design of a communication system (e.g., ultra-reliable and low latency communication URLLC) in which reliability of communication and/or service and/or a terminal, etc. sensitive to latency is taken into consideration is also discussed.

In the following specification, for convenience of description, a next-generation radio access technology is referred to as a new RAT (NR, radio access technology). A wireless communication system to which the NR is applied is referred to as an NR system.

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an $X_n$ interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerologies and Frame Structure

In the NR, a plurality of numerologies is supported. The numerology is defined by a subcarrier spacing and CP overhead. A plurality of subcarrier spacings may be derived by scaling a basic subcarrier spacing by an integer N. A numerology used may be selected independently of a frequency band although it is assumed that a very low subcarrier spacing is not used in a very high carrier frequency. In this case, a flexible network and a UE channel bandwidth are supported.

In the RAN1 spec. viewpoint, a maximum channel bandwidth per NR carrier is 400 MHz. In the case of at least one numerology, the candidates of a maximum subcarrier number per NR carrier are 3300 or 6600 in the RAN1 spec. viewpoint.

Subframe duration is fixed to 1 ms, and a frame length is 10 ms. A scalable numerology needs to permit a subcarrier spacing of at least 15 kHz-480 kHz. All numerologies having a great subcarrier spacing of 15 kHz or more regardless of CP overhead are arranged in a symbol boundary for each 1 ms of an NR carrier.

More specifically, normal CP series are selected as follows.

If a subcarrier spacing is 15 kHz*$2^n$ (n is an integer not a negative number), Each symbol length (including a CP) of the 15 kHz subcarrier spacing is identical with the sum of corresponding $2^n$ symbols of a scaled subcarrier spacing.

In each 0.5 ms, all OFDM symbols within 0.5 ms have the same size in addition to the first OFDM symbol.

The first OFDM symbol within 0.5 ms is 16Ts (assuming 15 kHz and an FFT size of 2048) longer than other OFDM symbols.

16Ts are used in a CP for the first symbol.

If a subcarrier spacing is 15 kHz*2n (n is a negative integer)

Each symbol length (including a CP) of the subcarrier spacing is the same as the sum of corresponding 2n symbols of 15 kHz.

A resource defined by one subcarrier and one symbol is called a resource element (RE).

A physical layer design supports an extended CP. The extended CP is only one in a given subcarrier spacing. An LTE-scaled extended CP is supported in at least 60 kHz subcarrier spacing. A CP type may be semi-statically configured using UE-specific signaling. A UE supporting an extended CP may depend on a UE type/capability.

The number of subcarriers per PRB is 12. An explicit DC subcarrier is not reserved for both the downlink and uplink. Regarding a DC present within a transmitter, DC processing of a DC subcarrier on the transmitter side is regulated as follows.

A receiver is aware of where a DC subcarrier is placed or whether the location of a DC subcarrier is notified (e.g., by spec. or signaling) or aware of whether a DC subcarrier is not present within a receiver bandwidth.

In the case of the downlink, a UE may assume that a DC subcarrier transmitted by the transmitter (gNB) side has been modulated. That is, data is not rate-matched or punctured.

In the case of the uplink, a DC subcarrier transmitted by the transmitter (UE) side is modulated. That is, data is not rate-matched or punctured.

In the case of the uplink, the transmitter DC subcarrier of the transmitter (UE) side needs to avoid a collision against at least DMRS.

At least one specific subcarrier needs to be defined as the candidate location of a DC subcarrier with respect to the uplink. For example, the DC subcarrier is positioned at the boundary of a PRB.

In the case of the uplink, means for allowing a receiver to determine a DC subcarrier position needs to be designated.

This is associated with a DC subcarrier position written in semi-static signaling from a UE and the standard.

If a DC subcarrier is not present, all subcarriers within a receiver bandwidth are transmitted.

In contrast, on the receiver side, special handling of a DC subcarrier has not been regulated in RAN1 on the receiver side. An operation needs to be implemented. That is, for example, the receiver may puncture data received in a DC subcarrier.

A slot is defined as 7 or 14 OFDM symbols with respect to the same subcarrier spacing up to 60 kHz having a normal CP and as 14 OFDM symbols at the same subcarrier spacing higher than 60 kHz having a normal CP.

A slot may include all downlinks, all uplinks or at least one downlink portion and at least one uplink portion. A slot set is supported. That is, data transmission may be scheduled as one or a plurality of slot spacings.

Furthermore, a mini-slot having the following length is defined.

A mini-slot having at least 6 GHz or more, length 1 symbol is supported.

Lengths from a length 2 to a slot length −1

In the case of URLLC, at least two are supported.

When a slot level channel/signal/procedure is designed, the followings need to be considered.

The possible occurrence of a mini-slot/slot transmission(s) that occupies resources scheduled for the on-going slot transmission(s) of a given carrier with respect to the same/different UEs At least one of DMRS formats/structures/configurations for a slot level data channel is reused for a mini-slot level data channel At least one of DL control channel formats/structures/configurations for slot level data scheduling is designed to be applied to mini-slot level data scheduling.

At least one of UL control channel formats/structures/configurations for slot level UCI feedback is designed to be applied to mini-slot level UCI feedback.

The following use case for designing a mini-slot is considered.

Support of a very low latency time including an URLLC with respect to a specific slot length.

A target slot length is at least 1 ms, 0.5 ms.

In particular, if a TXRP uses beam-sweeping (e.g., 6 GHz or more), a finer TDM granularity for the same or different UE within a slot is supported.

NR-LTE co-existence

Forward compatibility for an unlicensed spectrum operation

Self-Cntained Sbframe Sructure

A time division duplexing (TDD) structure considered in an NR system is a structure in which both uplink (UL) and downlink (DL) are processed in one subframe. This is for minimizing latency of data transmission in the TDD system, and the structure is called a self-contained subframe structure.

Figure 2:
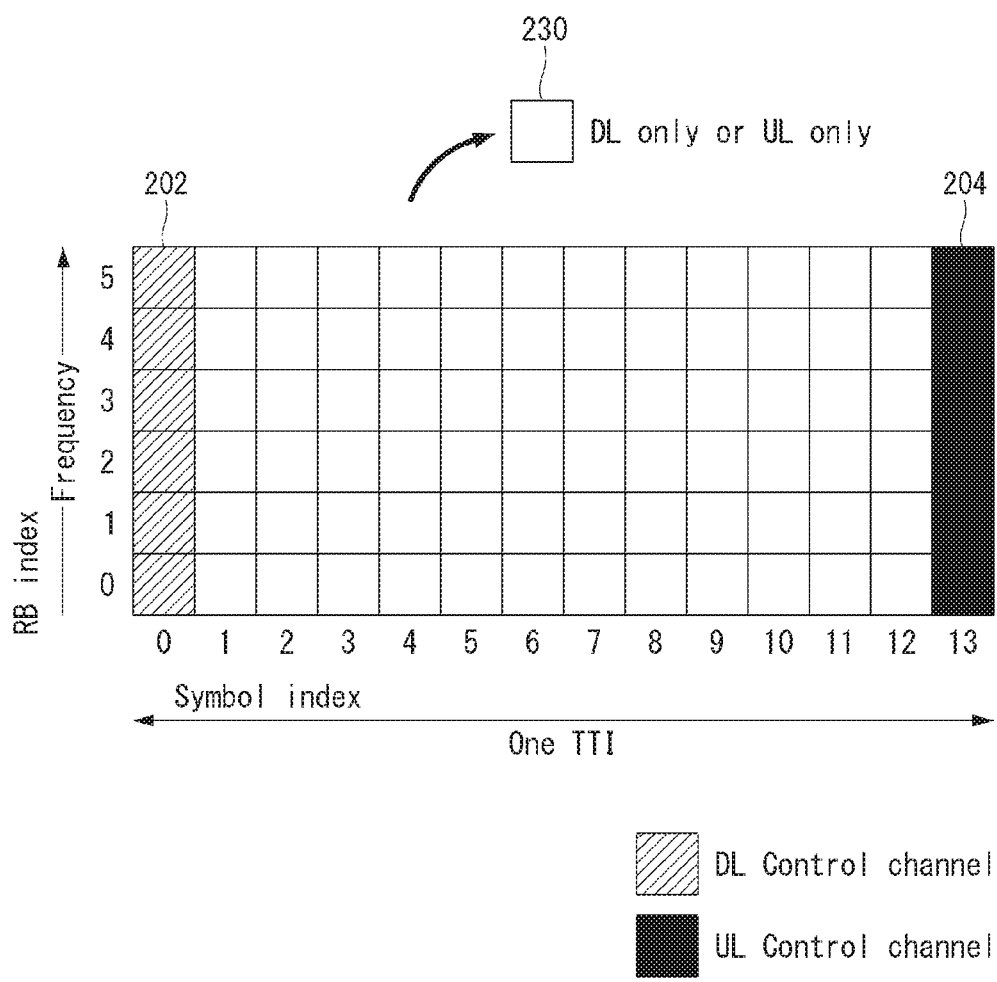
FIG. 2 illustrates one example of a self-contained subframe structure to which the method proposed in the present invention may be applied.

FIG. 2 illustrates an example of a self-contained subframe structure to which the method proposed by the present invention may be applied. FIG. 2 is only for convenience of description and does not limit the scope of the present invention.

Referring to FIG. 2, as in the case of legacy LTE, a case where one subframe includes 14 orthogonal frequency division multiplexing (OFDM) symbols is assumed.

In FIG. 2, a region 202 means a downlink control region, and a region 204 means an uplink control region. Furthermore, a region (i.e., region not having separate indication) other than the region 202 and the region 204 may be used for the transmission of downlink data or uplink data.

That is, uplink control information and downlink control information are transmitted in one self-contained subframe. In contrast, in the case of data, uplink data or downlink data is transmitted in one self-contained subframe.

If the structure shown in FIG. 2 is used, downlink transmission and uplink transmission are sequentially performed and the transmission of downlink data and the reception of uplink ACK/NACK may be performed within one self-contained subframe.

As a result, when an error in data transmission occurs, the time taken up to the retransmission of data can be reduced. Accordingly, latency related to data delivery can be minimized.

In a self-contained subframe structure such as FIG. 2, there is a need for a time gap for a process for a base station (eNodeB, eNB, gNB) and/or a terminal (user equipment (UE)) to switch from a transmission mode to a reception mode or from the reception mode to the transmission mode. In relation to the time gap, if uplink transmission is performed after downlink transmission in the self-contained subframe, some OFDM symbol(s) may be configured as a guard period (GP).

Uplink Control Channel

Physical uplink control signaling should be able to at least carry hybrid-ARQ acknowledgment, CSI report (including beamforming information if possible), and a scheduling request.

At least two transmission methods are supported for the UL control channel supported by the NR system.

The uplink control channel may be transmitted around a last transmitted uplink symbol(s) of a slot in short duration. In this case, the uplink control channel is time-division-multiplexed and/or frequency-division-multiplexed with an uplink (UL) data channel in the slot. One-symbol unit transmission of the slot is supported with respect to the uplink control channel of the short duration.

Short uplink control information (UCI) and data are frequency-division-multiplexed at least between the UE and the UE in the case where the physical resource blocks (PRBs) for the short UCI and the data do not overlap.

In order to support time division multiplexing (TDM) of short PUCCH from different UEs in the same slot, a mechanism for notifying to the UE whether the symbol(s) in the slot to transmit the short PUCCH is supported at least at 6 GHz or more is supported.

With respect to 1-symbol duration, supported at least are 1) that when a reference signal (RS) is multiplexed, the UCI and the RS is multiplexed to a given OFDM symbol by a frequency division multiplexing (FDM) scheme and 2) that subcarrier spacings between downlink (DL) and uplink (UL) data and the short duration PUCCH are the same as each other in the same slot.

At least, the short duration PUCCH during 2-symbol duration is supported. In this case, the subcarrier spacings between the downlink (DL) and uplink (UL) data and the short duration PUCCH are the same as each other in the same slot.

At least, a semi-static configuration is supported, in which a PUCCH resource of the UE given in the slot, that is, short PUCCHs of different UEs may be time-division-multiplexed within given duration.

The PUCCH resource includes a time domain and a frequency domain and if applicable, the PUCCH resource includes a code domain.

The short duration PUCCH may be extended to the end of the slot from the viewpoint of the UE. In this case, after the short duration PUCCH, an explicit gap symbol is not required.

In regard to a slot (that is, a DL-centric slot) having a short UL part, when data is scheduled in a short uplink part, 'short UCI' and data may be frequency-division-multiplexed by one UE.

The uplink control channel may be transmitted over multiple uplink symbols during long duration in order to improve coverage. In this case, the uplink control channel is frequency-division-multiplexed with the uplink data channel in the slot.

At least, a UCI carried by a long duration UL control channel may be transmitted in one slot or multiple slots by a design with a low peak to average power ratio (PAPR).

Transmission using multiple slots is allowed for a total duration (e.g., 1 ms) in at least some cases.

For the long duration uplink control channel, time division multiplexing (TDM) between the RS and the UCI is supported with respect to DFT-S-OFDM.

The long UL part of the slot may be used for transmitting the long duration PUCCH. That is, the long duration PUCCH is supported with respect to both a UL-only slot and a slot having symbols of a variable number constituted by a minimum of four symbols.

At least with respect to a 1 or 2-bit UCI, the UCI may be repeated in N (N>1) slots and the N slots may be adjacent or not adjacent in slots in which the long duration PUCCH is allowed.

At least, simultaneously transmission of the PUSCH and the PUCCH is supported with respect to a long PUCCH. That is, even when there is data, the uplink control for the PUCCH resource is transmitted. Further, in addition to the simultaneous transmission of the PUCCH and the PUSCH, the UCI in the PUSCH is supported.

Intra-TTI slot frequency hopping is supported.

A DFT-s-OFDM waveform is supported.

A transmit antenna diversity is supported.

TDM and FDM between the short duration PUCCH and the long duration PUCCH are supported for other UEs in at least one slot. In the frequency domain, the PRB (or multiple PRBs) is the minimum resource unit size for the UL control channel. When hopping is used, frequency resources and hopping may not spread to a carrier bandwidth. Further, a UE-specific RS is used for NR-PUCCH transmission. A set of PUCCH resources is configured by higher layer signaling and the PUCCH resources within the configured set is indicated by downlink control information (DCI).

As part of the DCI, the timing between data reception and hybrid-ARQ acknowledgment transmission should be dynamically (at least together with RRC) indicated. A combination of the semi-static configuration and dynamic signaling (for at least some types of UCI information) is used to determine the PUCCH resource for 'long and short PUCCH formats'. Here, the PUCCH resource includes the time domain and the frequency domain and, if applicable, the PUCCH resource includes the code domain. Using UCI on the PUSCH, that is, a part of the scheduled resource for the UCI is supported in the case of simultaneous transmission of the UCI and the data.

Further, at least a single HARQ-ACK bit uplink transmission is supported at least. In addition, a mechanism is supported, which enables the frequency diversity. Further, in the case of Ultra-Reliable and Low-Latency Communication (URLLC), a time interval between scheduling (SR) resources configured for the UE may be smaller than one slot.

x-Physical Uplink Control Channel (PUCCH) Format (1) Physical uplink control channel (xPUCCH)

The physical uplink control channel, i.e., xPUCCH, carries the uplink control information. The xPUCCH may be transmitted in a last symbol of the subframe.

All xPUCCH formats adopts cyclic shift and $n_{cs}^{cell}(n_s)$. Here, the cyclic shift is changed by slot number $n_s$. The cyclic shift is defined according to Equation 1.

$$n_{cs}^{cell}(n_s) = \Sigma_{i=0}^{7} c(8N_{symb}^{UL} \cdot \bar{n}_s + i) \cdot 2^i$$

$$\bar{n}_s = n_s \bmod 20 \quad \text{[Equation 1]}$$

In Equation 1, c(i) denotes the pseudo-random sequence and a pseudo-it random sequence generator is initialized by $c_{init} = n_{ID}^{RS}$.

The physical uplink control channel supports multiple formats as shown in Table 1.

TABLE 1

| xPUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 96 |

(2) xPUCCH formats 1, 1a, and 1b

For xPUCCH format 1, information is carried by presence/absence of the transmission of the xPUCCH from the UE. For xPUCCH format 1, d (0)=1 is assumed.

For each of xPUCCH formats 1a and 1b, one or two explicit bits are transmitted. Blocks b(0), . . . , b($M_{bit}$-1) of bits are modulated as described in Table 2, resulting in a complex-valued symbol d(0). Modulation schemes for other xPUCCH formats are given in Table 2.

TABLE 2

| PUCCH format | b (0), . . . , b($M_{bit}$ − 1) | d(0) |
|---|---|---|
| 1a | 0 | 1 |
|  | 1 | −1 |
| 1b | 00 | 1 |
|  | 01 | −j |
|  | 10 | j |
|  | 11 | −1 |

The complex-valued symbol d(0) is multiplexed into a sequence of cyclically shifted lengths $N_{seq}^{PUCCH}=48$ for each of P antenna ports used for xPUCCH transmission according to Equation 2.

$$y^{(\tilde{p})}(n) = \frac{1}{\sqrt{P}} d(0) \cdot r_{u,v}^{(\alpha_{\tilde{p}})}(n), \quad \text{[Equation 2]}$$

$$n = 0, 1, \ldots, N_{seq}^{PUCCH} - 1$$

In Equation 2, $r_{u,v}^{(\alpha_{\tilde{p}})}(n)$ is defined as $M_{sc}^{RS}=N_{seq}^{PUCCH}$ and an antenna port specific cyclic shift is defined as shown in Equation 3.

$$\alpha_{\tilde{p}}(n_s) = 2\pi \cdot n_{cs}^{(\tilde{p})}(n_s) / N_{sc}^{RB} \qquad \text{[Equation 3]}$$

$$n_{cs}^{(\tilde{p})}(n_s) = \left[ n_{cs}^{cell}(n_s) + n_{CS}^{xPUCCH,1} + \frac{N_{sc}^{RB} \tilde{p}}{P} \right] \bmod N_{sc}^{RB}$$

$$\tilde{p} \in \{0, 1, \ldots, P-1\}$$

In Equation 3, $n_{CS}^{xPUCCH,J} \in \{0,2,3,4,6,8,9,10\}$ is configured by higher layers.

The block y of the complex-valued symbols is mapped to z according to Equation 4.

$$z^{(\tilde{p})}(n_{xPUCCH}^{(1)} \cdot N_{xPUCCH}^{RB} \cdot N_{sc}^{RB} + m' \cdot N_{sc}^{RB} + k') = y^{(\tilde{p})}(8 \cdot m' + k) \qquad \text{[Equation 4]}$$

In Equation 4, k', m', and xPUCCH are as shown in Equation 5.

$$k' = \begin{cases} k & 0 \le k \le 1 \\ k+2 & 2 \le k \le 5 \\ k+4 & 6 \le k \le 7 \end{cases} \qquad \text{[Equation 5]}$$

$$m' = 0, 1, 2, \ldots, 5$$

$$N_{xPUCCH}^{RB} = 6$$

The resources used for transmission of the xPUCCH formats 1, 1a, and 1b are identified by a resource index $n_{xPUCCH}^{(1)}$, and $n_{xPUCCH}^{(1)}$ is configured by the higher layers and indicated on the x-Physical Downlink Control Channel (xPDCCH).

(3) xPUCCH format 2

The block $b(0), \ldots, b(M_{bit}-1)$ of bits are scrambled by a UE-specific scrambling sequence, resulting in a block $\tilde{b}(0), \ldots, \tilde{b}(M_{bit}-1)$ of scrambled bits according to Equation 6.

$$\tilde{b}(i) = (b(i) + c(i)) \bmod 2 \qquad \text{[Equation 6]}$$

In Equation 6, c(i) denotes the pseudo-random sequence and the pseudo-random sequence generator is initialized at the beginning of each subframe by $c_{init} = (\lfloor \bar{n}_s/2 \rfloor + 1) \cdot (2N_{ID}^{cell} + 1) \cdot 2^{16} + n_{RNTI}$. Here, $\bar{n}_s = n_s \bmod 20$ and $n_{RNTI}$ denotes a Cell Radio Network Temporary Identifier (C-RNTI).

The scrambled blocks $\tilde{b}(0), \ldots, \tilde{b}(M_{bit}-1)$ of bits are Quadrature Phase-Shift Keying (QPSK) modulated, resulting in blocks $d(0), \ldots, d(M_{symb}-1)$ of the complex-valued modulation symbols. Here, $M_{symb}$ is $M_{bit}/2$.

1) Layer Mapping

The complex-valued modulation symbols to be transmitted are mapped to one or two layers. The complex-valued modulation symbols $d(0), \ldots, d(M_{symb}-1)$ are mapped to the layers $x(i) = [x^{(0)}(i) \ldots x^{(\nu-1)}(i)]^T$. Here, $i = 0, 1, \ldots, M_{sumb}^{layer}-1$, v denotes the number of layers, and $M_{symb}^{layer}$ denotes the number of modulation symbols per layer.

For transmission at a single antenna port, a single layer is used (i.e., v=1) and the mapping is defined according to Equation 7. In this case, $M_{symb}^{layer}$ is $M_{symb}^{(0)}$.

$$x^{(0)}(i) = d(i) \qquad \text{[Equation 7]}$$

For transmission at two antenna ports, a mapping rule of two layers may be defined according to Equation 8. In this case, $M_{symb}^{layer}$ is $M_{symb}^{(0)}/2$.

$$x^{(0)}(i) = d(2i)$$

$$x^{(1)}(i) = d(2i+1) \qquad \text{[Equation 8]}$$

2) Precoding

A precoder takes a block $[x^{(0)}(i) \ldots x^{(\nu-1)}(i)]^T$ (here, $i = 0, 1, \ldots, M_{symb}^{layer}-1$) of vectors as an input from the layer mapping and generates a block $[Y^{(0)}(i) \ldots y^{(p-1)}(i)]^T$ (here, $i = 0, 1, \ldots, M_{symb}^{ap}-1$) of vectors to be mapped to the resource elements.

For the transmission at the single antenna port, precoding is defined by Equation 9. In this case, $i = 0, 1, \ldots, M_{symb}^{ap}-1$ and $M_{symb}^{ap}$ is $M_{symb}^{layer}$.

$$y^{(0)}(i) = x^{(0)}(i) \qquad \text{[Equation 9]}$$

For the transmission at two antenna ports $\tilde{p} \in \{0, 1\}$, an output $y(i) = [y^{(0)}(i) \, y^{(1)}(i)]^T$ of a precoding operation (here, $i = 0, 1, \ldots, M_{symb}^{ap}-1$) is defined by Equation 10. In this case, $i = 0, 1, \ldots, M_{symb}^{layer}-1$ and $M_{symb}^{ap}$ is $2M_{symb}^{layer}$.

$$\begin{bmatrix} y^{(0)}(2i) \\ y^{(1)}(2i) \\ y^{(0)}(2i+1) \\ y^{(1)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \text{Re}(x^{(0)}(i)) \\ \text{Re}(x^{(1)}(i)) \\ \text{Im}(x^{(0)}(i)) \\ \text{Im}(x^{(1)}(i)) \end{bmatrix} \qquad \text{[Equation 10]}$$

The mapping to the resource elements is defined by the operation in quadruplets of the complex-valued symbols. When $w^{(\tilde{p})}(i) = \langle y^{(\tilde{p})}(4i+1), y^{(\tilde{p})}(4i+2), y^{(\tilde{p})}(4i+3) \rangle$ means a symbol quadruplet i for an antenna port $\tilde{P}$, a block $w^{(\tilde{p})}(0), \ldots, w^{(\tilde{p})}(M_{quad}-1)$ (here, $M_{quad} = M_{symb}/4$) of the quadruplets is cyclically shifted, resulting in $\bar{w}^{(\tilde{p})}(0), \ldots, \bar{w}^{(\tilde{p})}(M_{quad}-1)$ (Here, $M_{quad} = M_{symb}/4$). Here, $\bar{w}^{(\tilde{p})}(i) = w^{(\tilde{p})}((i + n_{cs}^{cell}(n_s)) \bmod M_{quad})$.

For xPUCCH format 2, the block of the complex-valued symbols is mapped to z according to Equation 11.

$$z^{(\tilde{p})}(n_{xPUCCH}^{(2)} \cdot N_{xPUCCH}^{RB} \cdot N_{sc}^{RB} + m' \cdot N_{sc}^{RB} + k') = \bar{w}^{(\tilde{p})}(sm' + k) \qquad \text{[Equation 11]}$$

In Equation 10, k' and m' are as shown in Equation 12.

$$k' = \begin{cases} k & 0 \le k \le 1 \\ k+2 & 2 \le k \le 5 \\ k+4 & 6 \le k \le 7 \end{cases} \qquad \text{[Equation 12]}$$

$$m' = 0, 1, 2, \ldots, 5$$

Further, $n_{xPUCCH}^{(2)}$ is configured by the higher layers and indicated in the xPDCCH.

In the case of the NR system, a self-contained subframe structure and/or a structure (i.e., a short TTI structure) in which a transmission time interval (TTI) is set to be short may be considered in order to minimize latency of transmission of control information and/or data. This allows the system to be configured more flexibly.

In the case of the above-described structures (e.g., the self-contained subframe structure and the short TTI structure), the uplink channel for carrying the uplink control information may be configured to be transmitted in one symbol. That is, the uplink control channel structure that may be considered in the NR system may be as shown in FIG. 3.

Hereinafter, for convenience of description, the uplink control channel in the NR system is described as being transmitted in one symbol, but the uplink control channel may be transmitted in multiple symbols (e.g., two symbols, three symbols, etc.) in addition to the one symbol.

Figure 3:
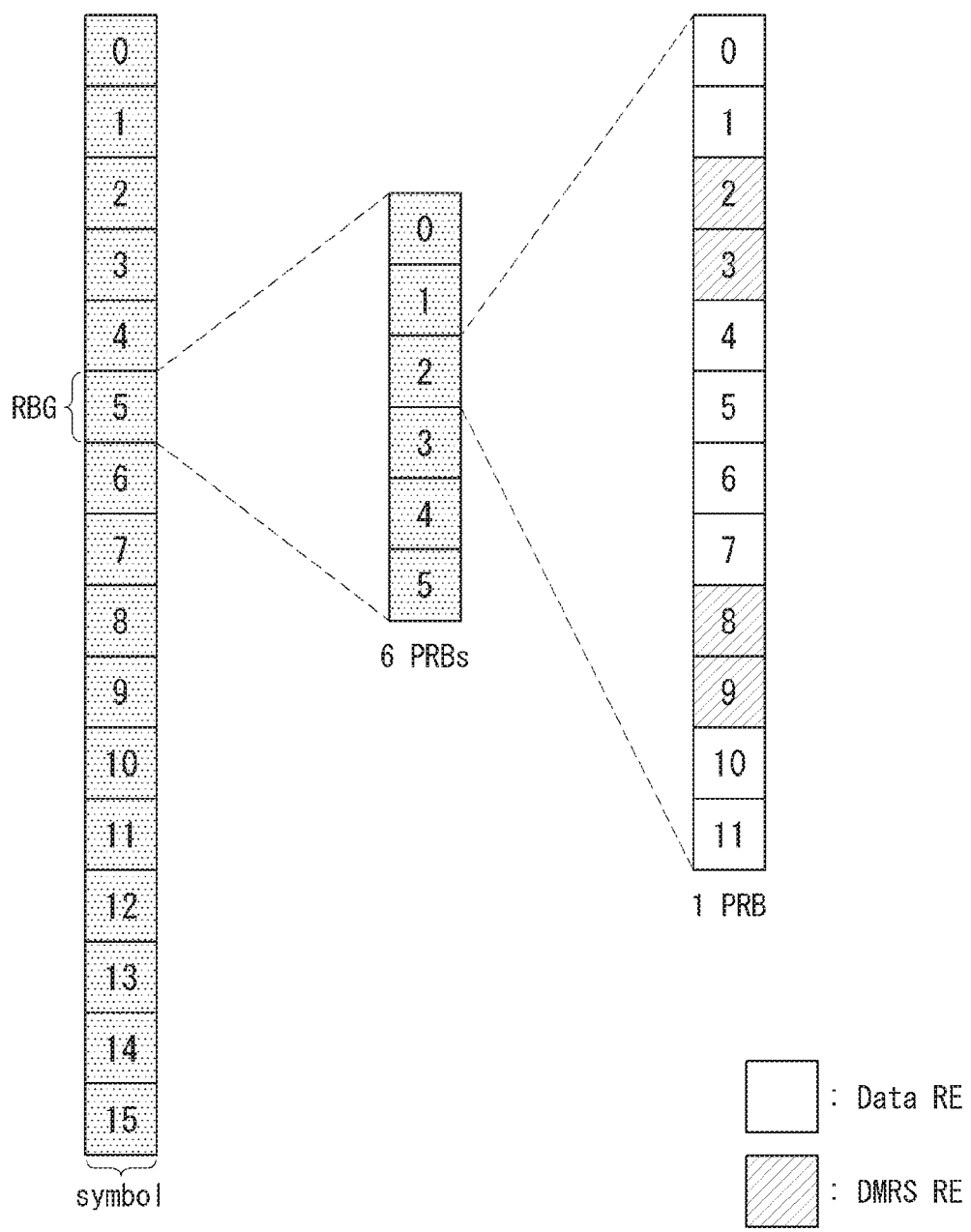
FIG. 3 illustrates an example of an uplink control channel structure applicable in an NR system.

FIG. 3 illustrates an example of an uplink control channel structure applicable in the NR system. FIG. 3 is only for convenience of the description and does not limit the scope of the present invention.

Referring to FIG. 3, it is assumed that the uplink control channel is transmitted in one symbol (i.e., one OFDM symbol).

One-unit uplink control channel is constituted by a total of six physical resource blocks (PRBs) constituting a resource block group (RBG) and may transmit (or carry) the uplink control information over a total of 72 resource elements (REs).

For example, the 72 REs are divided into a ratio of 2:1, and as a result, 48 REs may be used for ACK/NAK data and 24 REs may be used for a demodulation reference signal (DMRS). Further, in various embodiments of the present invention, the DMRS may be replaced by various reference signals (RS) that may be applied in the uplink channel.

At this time, the ratio may be applied to each of the PRBs constituting the RBG. Here, the structure of the uplink control channel applied to one PRB may be referred to as a basic structure of the uplink control channel.

Figure 4:
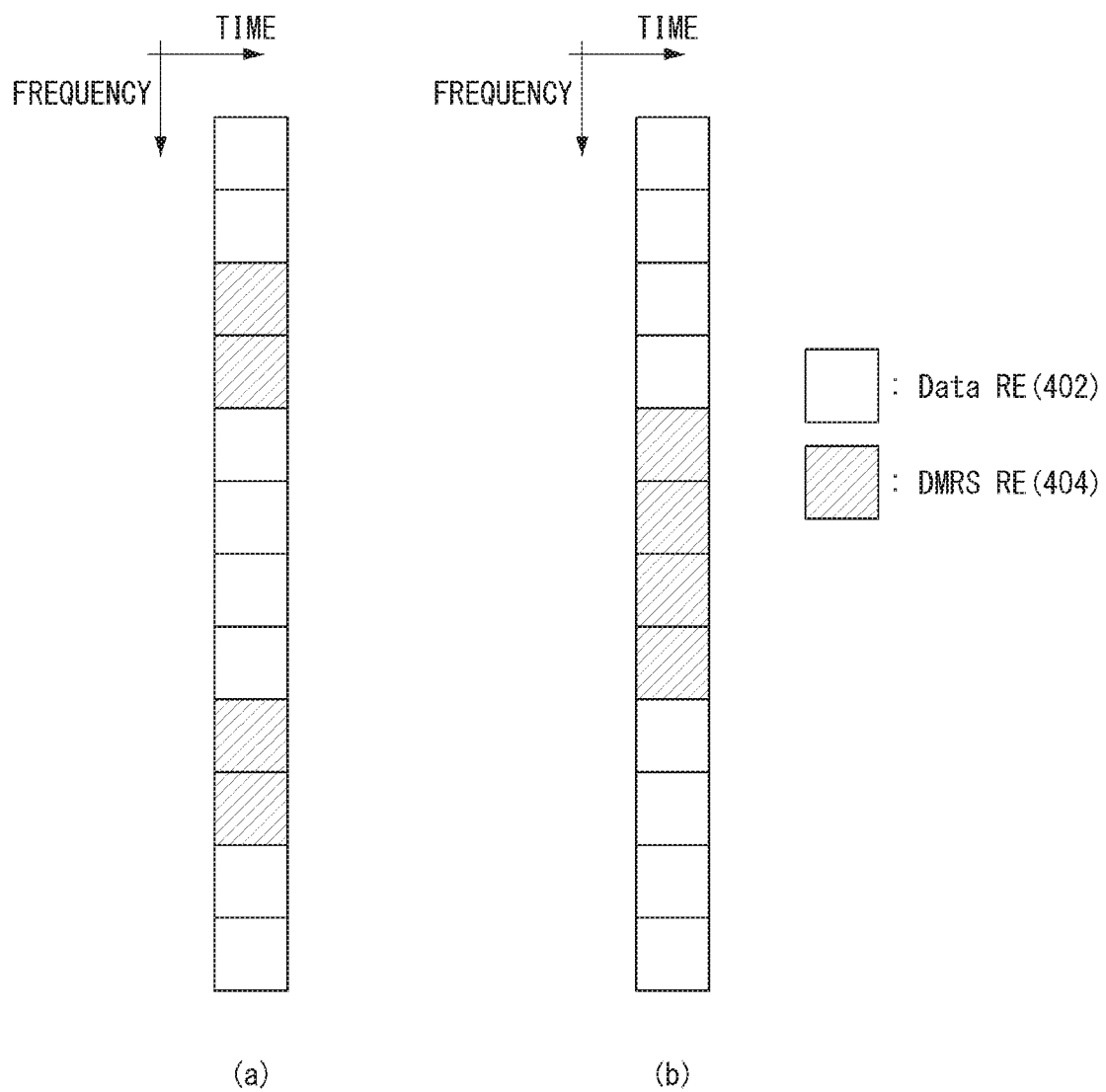
FIG. 4 illustrates an example of a basic unit structure for an uplink control channel applicable in the NR system.

FIG. 4 illustrates an example of a basic unit structure for an uplink control channel applicable in the NR system. FIG. 4 is only for convenience of the description and does not limit the scope of the present invention.

Referring to FIG. 4, for 12 REs constituting the PRB, eight REs may be allocated to data RE 402 used for transmitting data (e.g., ACK/NACK data) and four REs may be allocated to DMRS RE 404 used for transmission for transmitting the DMRS. At this time, the four DMRS REs may be dispersed by two as shown in FIG. 4(*a*) or may be concentratively configured as shown in FIG. 4(*b*).

In addition, the method proposed in the present invention may be applied not only to a case where the data RE and the DMRS RE of the uplink control channel are configured in the ratio of 2:1, but also to a case where the data is configured in various ratios.

The present invention proposes a method for mapping information (i.e., uplink control information (UCI), DMRS, and the like) to the uplink control channel, including an example that may be considered in the NR system as described above.

More specifically, the present invention proposes a mapping method for enhancing the detection performance of the ACK/NACK data by maintaining a large chordal distance value between the ACK/NACK data (e.g., 2-bit ACK/NACK).

First Embodiment—Mapping Method According to Energy Relationship Between DMRS Region and Data Region In case of transmitting two transport blocks (TB) at the same time using multiple antennas in downlink (DL), the UE transmits 2-bit ACK/NACK (2 bits ACK/NACK) for two transport block received by the downlink through the uplink control channel.

In this case, when a unit of 1 PRB, which is a basic unit, is considered, the UE may map the 2-bit ACK/NACK to the data RE using the QPSK modulation scheme and transmit the 2-bit ACK/NACK.

In this case, in order to enhance the detection performance of the 2-bit ACK/NACK information transmitted on the uplink control channel, a mapping scheme based on the energy relationship allocated to the DMRS region and the data region may be considered.

Here, the detection performance for the 2-bit ACK/NACK information may be enhanced as the chordal distance between two states of the 2-bit ACK/NACK information becomes larger. In this case, each state of the 2-bit ACK/NACK information may mean a first state (i.e., state 0) [ACK, ACK], a second state (i.e., state 1) [ACK, NACK], a third state (i.e., state 2) [NACK, NACK], and a fourth state (i.e., state 3) [NACK, ACK].

The chordal distance may be expressed by Equation 13 below.

$$\sqrt{1-|S(i) \cdot S(j)^H|} \qquad \text{[Equation 13]}$$

In Equation 13, S(i) and S(j) may be mapped sequences for different ACK/NACK states.

As described above, in order to keep the chordal distance related to the detection performance as large as possible, a method may be considered, in which regardless of the ratio of the RE number between the number of REs and the data RE constituting the uplink control channel, energy allocated to the DMRS region and the data region are configured to be the same as each other and mapped. In other words, the coded distance may be largely maintained in accordance with a scheme that performs so that the sum of the power allocated to the DMRS REs and the sum of the power allocated to the data REs are set equal to each other.

At this time, even if the number of DMRS REs constituting the uplink control channel is different from the number of data REs, the energy allocated to the DMRS region and the energy allocated to the data region are set equal to each other, and as a result, the chordal distance may be kept (or set) as large as possible.

In this case, increasing the chordal distance may mean increasing an average value of the chordal distances between the respective states and/or increasing a minimum value of the chordal distance between the respective states.

For example, when the 2-bit ACK/NACK information is mapped through the QPSK modulation, each of four states may correspond to a QPSK modulation signal (or a QPSK modulation symbol) and the corresponding QPSK modulation signal may be mapped to the data RE of the uplink control channel.

Specifically, the first state (i.e., state 0) may correspond to '0', the second state (i.e., state 1) may correspond to 'j', the third state (i.e., state 2) may correspond to '−1', and a fourth state (i.e., state 3) may correspond to 'j'.

As an example, when the UE desires to transmit the second state (i.e., [ACK, NACK]) information to the eNB, the UE may transmit the uplink control channel in which 'j' is mapped to the data REs to the eNB.

In the case of the basic structure of the uplink control channel constituted by 12 REs as illustrated in FIG. 4, the QPSK modulation signal may be repeatedly mapped to 8 data REs and DMRS may mapped to the remaining 4 REs (i.e., DMRS REs).

In this case, the QPSK modulation signal (i.e., QPSK modulation signal) may be spread and mapped to multiple data REs or mapped only to a specific data RE.

Figure 5:
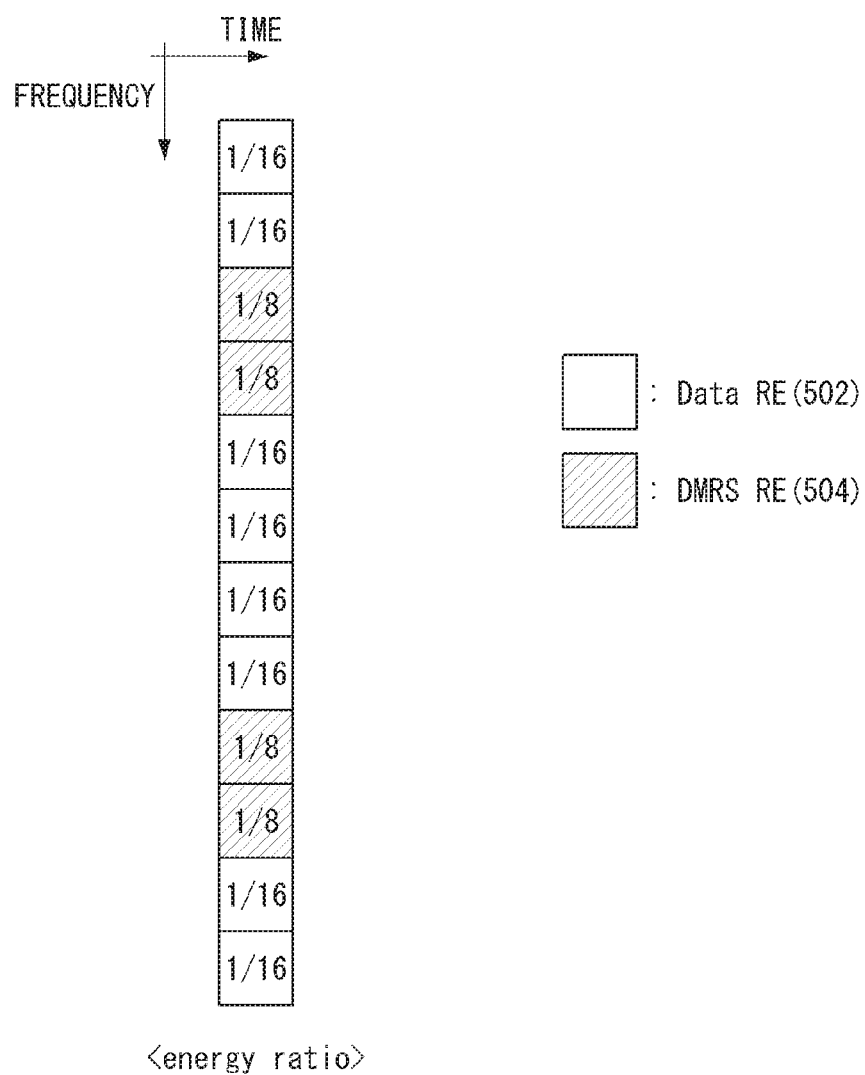
FIG. 5 illustrates an example of energy allocated to resource elements of the uplink control channel according to an embodiment of the present invention.

In this case, when the amount of energy allocated to one basic unit is assumed to be "1", the energy allocated to each RE may be configured as illustrated in FIG. 5 in order to allocate the same energy to the DMRS region and the data region.

FIG. 5 illustrates an example of energy allocated to resource elements of the uplink control channel according to an embodiment of the present invention. FIG. 5 is only for convenience of the description and does not limit the scope of the present invention.

Referring to FIG. 5, it is assumed that the uplink control channel of the basic unit (i.e., 1 PRB) is constituted by 8 data REs 502 and 4 DMRS REs 504.

When the amount of energy allocated to the entire uplink control channel is '1', the power may be allocated so that ⅛ of total energy is allocated to each DMRS RE and the power may be allocated so that 1/16 of total energy is allocated to each data RE.

Accordingly, the amount of energy allocated to the DMRS region (i.e., four DMRS REs) and the amount of energy allocated to the data region (i.e., eight data REs) are equal to each other.

As described above, the amount of energy allocated to the DMRS region and the amount of energy allocated to the data region are set to be equal to each other, the chordal distance may be set as large as possible.

The above-described method is applied even to sizes (i.e., the number of REs included in the basic unit) of various basic transmission units and ratios between various DMRS REs and data REs by adonlying the amount of energy (or power) allocated to each RE.

Figure 6:
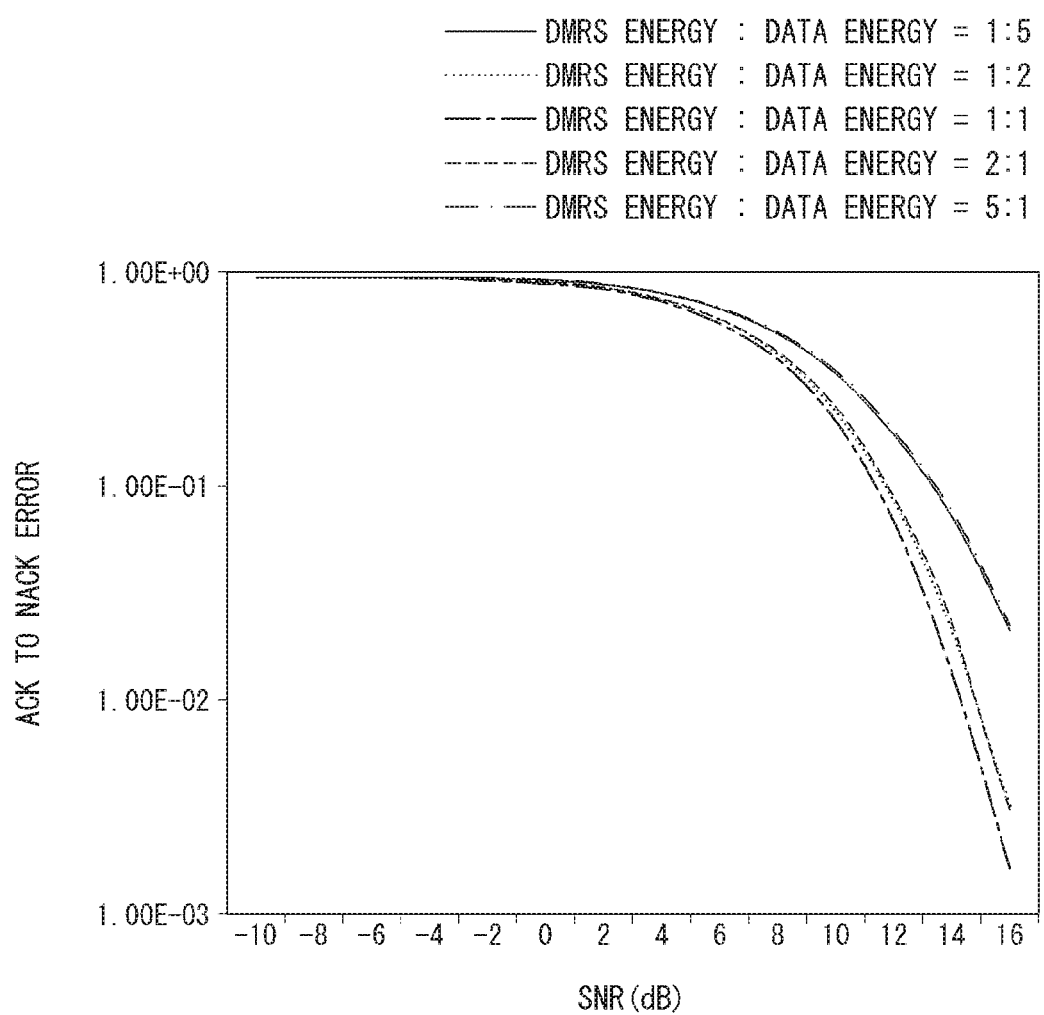
FIG. 6 illustrates a simulation result of ACK-to-NACK error performance according to an embodiment of the present invention.

FIG. 6 illustrates a simulation result of ACK-to-NACK error performance according to an embodiment of the present invention. FIG. 6 is only for convenience of the description and does not limit the scope of the present invention.

Referring to FIG. 6, it is assumed that the ratio of the energy allocated to the DMRS region of the uplink control channel to the energy allocated to the data region is set to 1:5, 1:2, 1:1, 2:1, and 5:1.

When the UE transmits the uplink control channel by setting the energy of the DMRS and the energy of the data equal to 1:1, a performance gain of approximately 2 dB is provided based on a target error rate (approximately 1%, i.e., in FIG. 6, an error corresponding to 1.00E-02) as compared with the case where the ratio is 1:5 or 5:1.

A performance difference between the ratios may be consistent with a tendency of a difference of the value of the chordal distance calculated for each ratio.

For example, the chordal distance between the first state (i.e., state 0) [ACK, ACK] and the second state (i.e., state 1) [ACK, NACK] in the 2-bit ACK/NACK transmission may be calculated as 0.5412 for the case where the energy ratio between the DMRS and the data is 1:1, 0.5046 for the energy ratio of 1:2 or 2:1, or 0.3875 for the energy ratio of 1:5 or 5:1.

That is, as illustrated in FIG. 6, the larger the chordal distance, the better the ACK-to-NACK error performance.

Further, the above-described scheme is different from the RS power boosting applied in the legacy LTE in terms of a scheme of controlling (or adonlying) the power allocated to the RE. Specifically, in the case of the RS power boosting, the eNB randomly increases the power allocated to the RE to which the RS is mapped to increase channel estimation performance. In contrast, in the scheme proposed by the present invention, in order to increase the detection and decoding performance of the information (e.g., 2-bit ACK/NACK information) (i.e., in order to set the chordal distance between the respective states as large as possible), the energy (or power) allocated to each RE is adonlyed (or controlled) by considering the energy (or the sum of the power) of the data region (i.e., data REs) and the RS region (i.e., DMRS REs) of the uplink control channel.

Further, the scheme proposed by the present invention is applied to the uplink control channel, while the RS power boosting is applied in the uplink data channel or downlink channels other than the uplink control channel.

Second Embodiment—BPSK Modulation Scheme Based Mapping Method

As described above, in addition to the scheme of adonlying the energy allocated to the DMRS region and the data region, a method for transmitting the 2-bit ACK/NACK by applying each of two Binary Phase-Shift Keying (BPSK) modulation signals to the 2-bit ACK/NACK in units of 1 bit may be considered.

For example, instead of repeatedly mapping the QPSK modulation signal as large as the number of data REs in FIG. 4, a method for mapping the BPSK modulation signal to each data RE may be considered. Here, the modulation signal may include a modulation symbol generated according to each modulation scheme.

Figure 7:
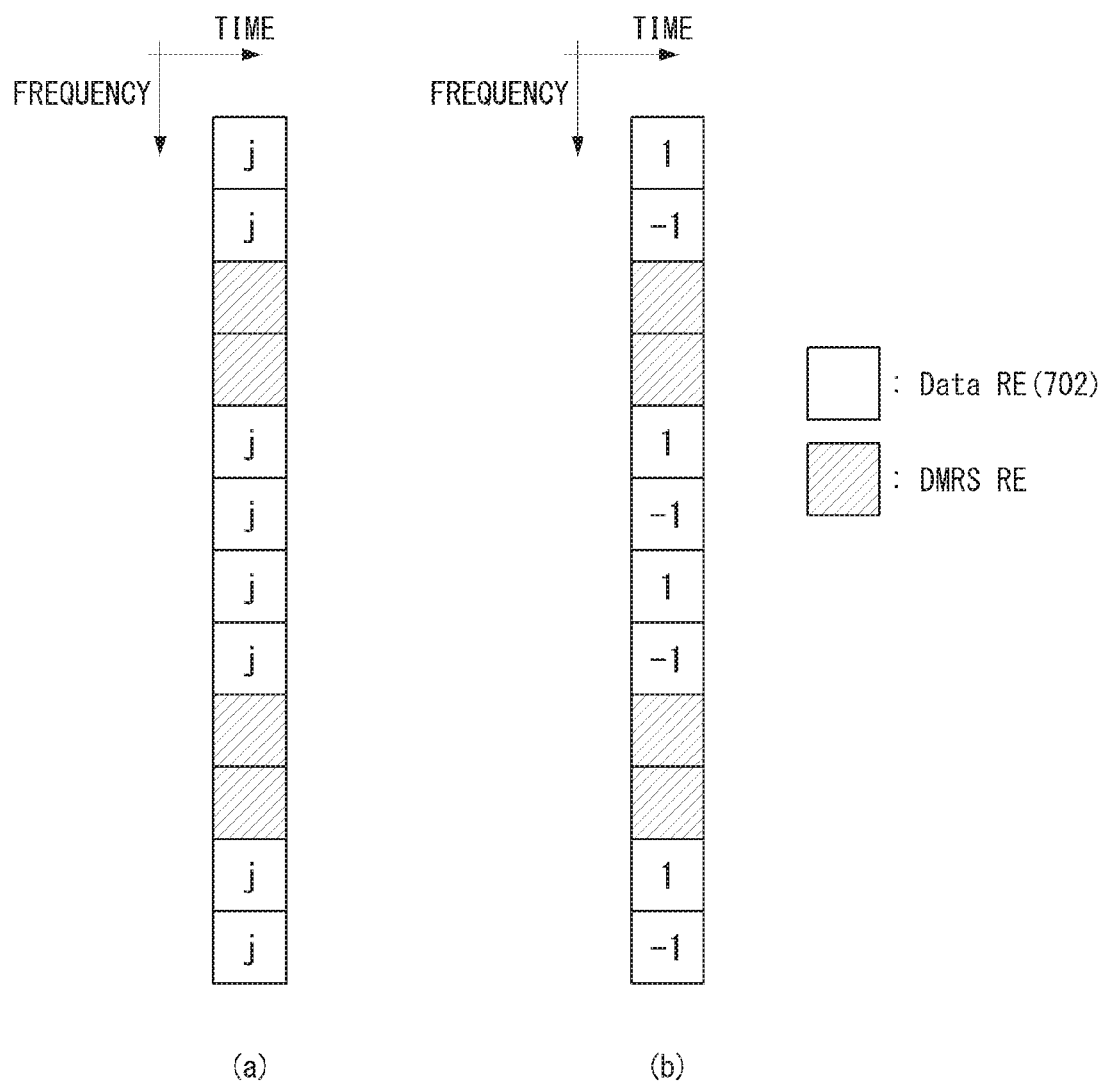
FIG. 7 illustrates examples of the uplink control channel to which a modulation signal for a 2-bit ACK/NACK is mapped according to various embodiments of the present invention.

FIG. 7 illustrates examples of the uplink control channel to which a modulation signal for a 2-bit ACK/NACK is mapped according to various embodiments of the present invention. FIG. 7 is only for convenience of the description and does not limit the scope of the present invention.

Referring to FIG. 7, it is assumed that the UE transmits the 2-bit ACK/NACK information [ACK, NACK] through the uplink control channel.

FIG. 7(a) illustrates an uplink control channel in which a QPSK modulation signal 'j' corresponding to 2-bit ACK/NACK information [ACK, NACK] is repeatedly mapped to data REs 702.

On the contrary, FIG. 7(b) illustrates an uplink control channel in which BPSK modulation signals corresponding to each bit of the 2-bit ACK/NACK information [ACK, NACK] are mapped to the data REs 702.

Specifically, instead of using the QPSK modulation signal, the UE may transmit the uplink control channel by mapping s a BPSK modulation signal '1' for [ACK] corresponding to a first bit (i.e., a first bit) of the 2-bit ACK/NACK information [ACK, NACK] and a BPSK modulation signal '−1' for [NACK] corresponding to a second bit (i.e., a second bit) to the data REs 702 of the uplink control channel.

As described above, when two BPSK modulation signals other than the QPSK modulation signal are used for the 2-bit ACK/NACK information transmission, the chordal distance between the respective states of the 2-bit ACK/NACK information may be set to be larger.

As the chordal distance is set to be larger, the detection performance for the 2-bit ACK/NACK information may be enhanced.

Figure 8:
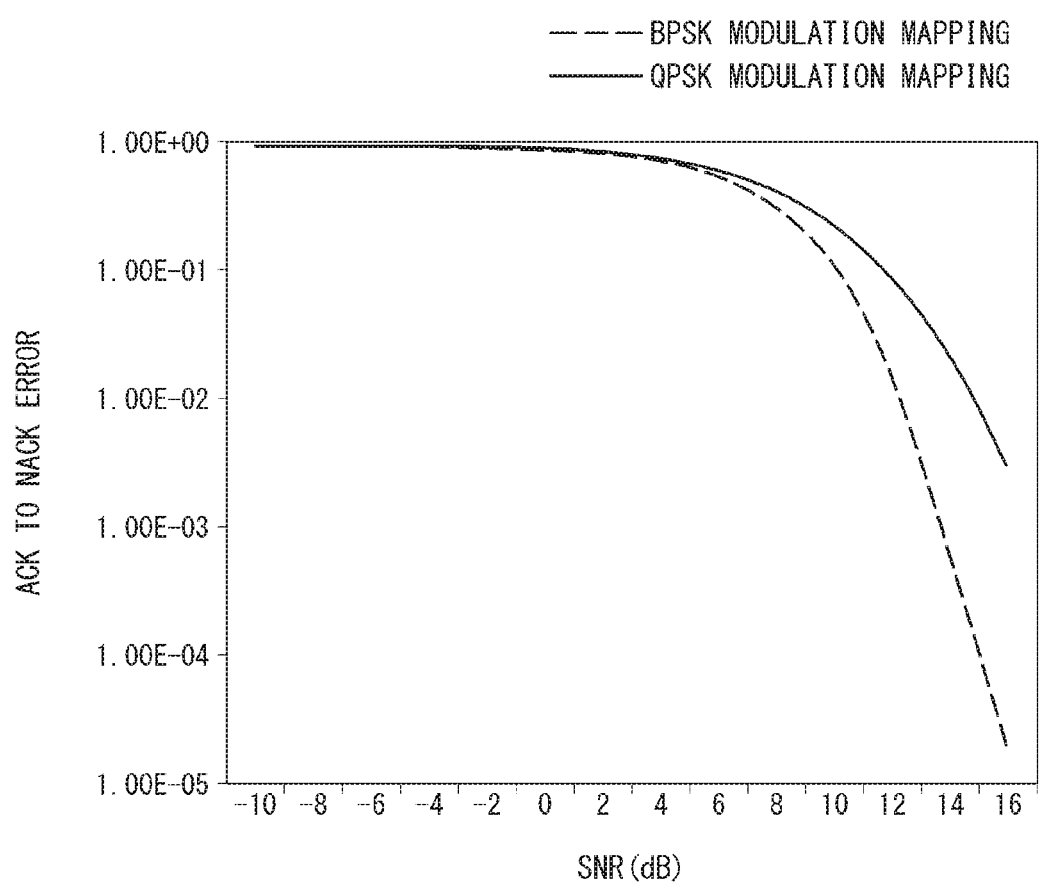
FIG. 8 illustrates a simulation result of ACK-to-NACK error performance according to another embodiment of the present invention.

FIG. 8 illustrates a simulation result of ACK-to-NACK error performance according to another embodiment of the present invention. FIG. 8 is only for convenience of the description and does not limit the scope of the present invention.

Referring to FIG. 8, it is assumed that the UE uses the mapping scheme based on the QPSK modulation signal or the BPSK modulation signal to transmit the 2-bit ACK/NACK information.

When the UE transmits the uplink control channel by performing the mapping using the BPSK modulation signal, a performance gain of approximately 2.6 dB is provided based on a target error rate (approximately 1%, i.e., in FIG. 8, an error corresponding to 1.00E-02) as compared with the case of using the QPSK modulation signal.

A performance difference between the ratios may be consistent with a tendency of a difference of the value of the chordal distance calculated for each ratio.

For example, the chordal distance between the first state (i.e., state 0) [ACK, ACK] and the second state (i.e., state 1) [ACK, NACK] in the 2-bit ACK/NACK transmission may be calculated as 0.8165 for the case of performing the mapping using the BPSK modulation signal and 0.5046 for the case of performing the mapping using the QPSK modulation signal.

That is, as illustrated in FIG. 8, the mapping scheme using the BPSK modulation signal having a larger chordal distance between two schemes is the better in the ACK-to-NACK error performance.

Figure 9:
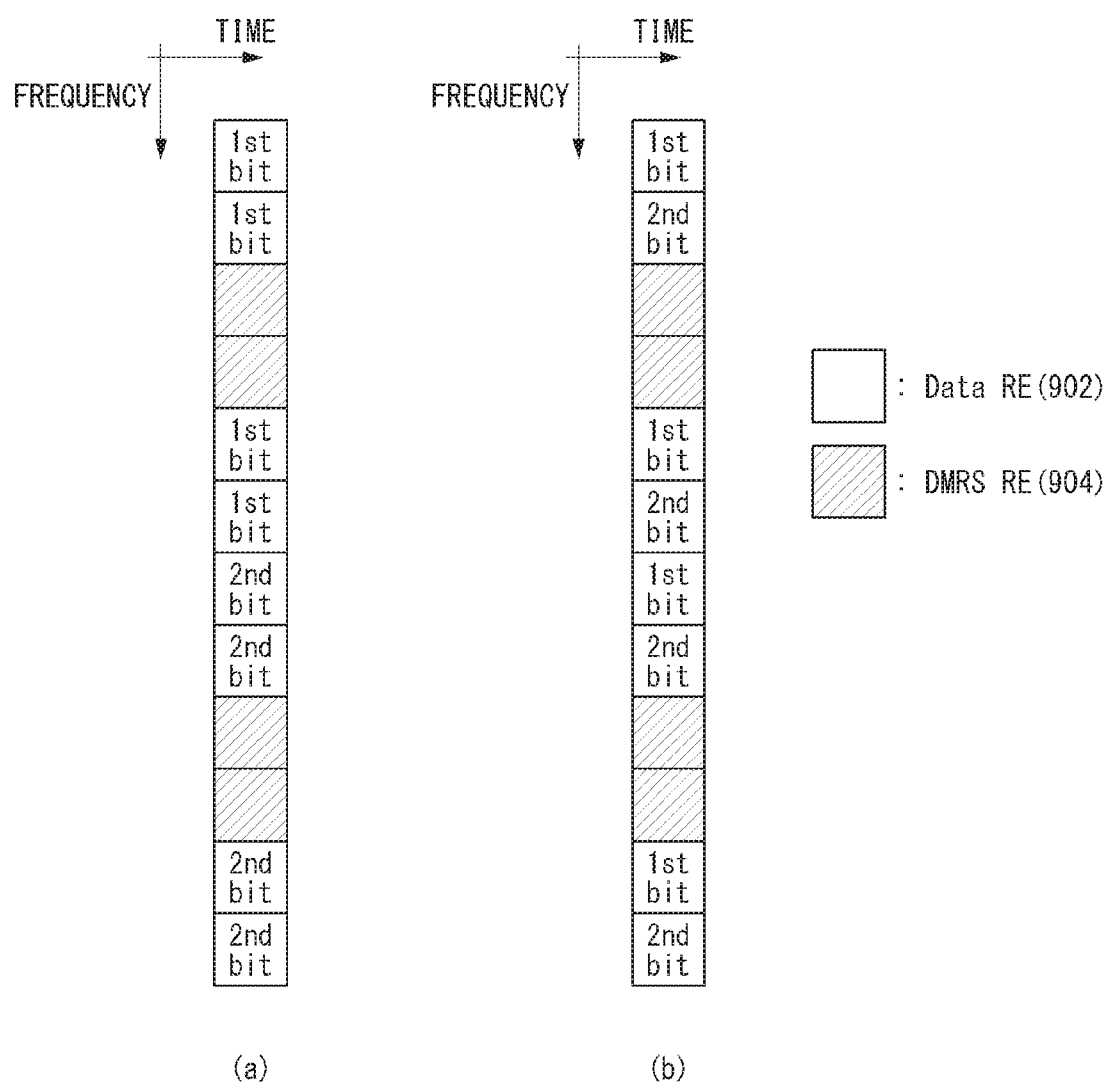
FIG. 9 illustrates examples in which BPSK modulation signals are mapped to an uplink control channel according various embodiments of the present invention.

In this case, in the case of the mapping scheme using the BPSK modulation signal, a localized mapping scheme or a distributed mapping scheme may be applied as illustrated in FIG. 9.

FIG. 9 illustrates examples in which BPSK modulation signals are mapped to an uplink control channel according to various embodiments of the present invention. FIG. 9 is only for convenience of the description and does not limit the scope of the present invention.

Referring to FIG. 9, it is assumed that the UE uses the BPSK modulation scheme in order to map the 2-bit ACK/NACK information to data REs 902 of the uplink control channel.

When the BPSK modulation scheme is used, the 2-bit ACK/NACK information may be mapped according to a localized scheme as illustrated in FIG. 9(*a*) or mapped according to a distributed scheme as illustrated in FIG. 9(*b*). Here, the distributed scheme means a scheme in which the first bit ($1^{st}$ bit) and the second bit ($2^{nd}$ bit) of the 2-bit ACK/NACK information are mapped to each other to cross each other.

Further, in the case of the mapping scheme using the BPSK modulation signal, the data REs 902 may be configured in two units for the 2-bit ACK/NACK information. When the UE configures the uplink control channel, the number of DMRS REs 904 and the number of data REs 902 may be set in consideration of the above two units.

For example, when the basic transmission unit is constituted by a total of five REs and the five REs are constituted by one DMRS RE and four data REs, the 2-bit ACK/NACK information configured in the two units may be repeatedly mapped to four data REs twice according to the localized or distributed scheme. Alternatively, when the basic transmission unit is constituted by a total of five REs and the five REs are constituted by three DMRS RE and two data REs, the 2-bit ACK/NACK information configured in the two units may be mapped once.

Such a scheme may be applied variously according to the number of REs constituting the basic transmission unit. Further, the setting (or configuration) for such a scheme may be predefined in the system, or the eNB may inform the UE of the setting through the higher layer signaling and/or downlink control information (DCI).

Further, for multiplexing between the UEs, the UE may transmit the uplink control channel by applying a sequence having a length corresponding to the number of REs in each group to each of a DMRS RE group, an RE group to which a first bit signal of the 2-bit ACK/NACK information is mapped, and an RE group to which a second bit signal of the 2-bit ACK/NACK information is mapped. Alternatively, the UE may transmit the uplink channel by applying a sequence of a length corresponding to the total number of REs to the entire basic transmission unit. Here, as the sequence, a Zadoff-Chu sequence or an orthogonal cover code may be considered. The method for applying the sequence may be applied to both the localized mapping scheme and/or the distributed mapping scheme.

Third Embodiment—Mapping Method by Combination of Methods Described Above

Further, in order to increase the detection (or decoding) performance of the information by making the chordal distance as large as possible between the respective states of the 2-bit ACK/NACK information, the two methods (that is, the first embodiment and the second embodiment) may be combined and applied.

Specifically, in the NR system, the energy allocated to the data region (i.e., the data REs) of the uplink control channel and the energy allocated to the DMRS region (i.e., the DMRS REs) are set to be equal to each other and the UE may transmit to the ENB the uplink control channel in which the BPSK modulation signals other than the QPSK modulation signal (or symbol) for the uplink control information (e.g., 2-bit ACK/NACK information) are mapped to the corresponding data REs. Here, the energy allocated to the data region means the sum of the power allocated to the data REs and the energy allocated to the DMRS region means the sum of the power allocated to the DMRS REs.

Through the combination of the two methods, an effect of enhancement of detection performance may be obtained, which is higher than enhancement of the detection performance of the uplink information which may be obtained in the case of applying each method.

Further, even in this case, the localized mapping scheme or distributed mapping scheme based BPSK modulation signal mapping described above may be adopted and may be additionally applied to the BPSK modulation signals to which the sequence (e.g., the Zadoff-Chu sequence, the OCC, etc.) for multiplexing between the UEs is mapped.

In addition, the methods proposed in the present invention are described as being applied to the 2-bit ACK/NACK information only for convenience of description and the methods may also be applied to a case where the UE transmits other UCIs (e.g., channel state information (CSI), etc.) of 2 bits or more. Further, the methods may also be applied to a case where the uplink control channel is configured over several symbols on a time axis and similarly applied to a case where each configuration is repeatedly configured on the time axis and/or a frequency axis.

Further, in regard to the methods, a method may also be considered, which controls (or randomizes) inter-cell interference by additionally applying a scrambling sequence to a signal mapped for each cell.

Figure 10:
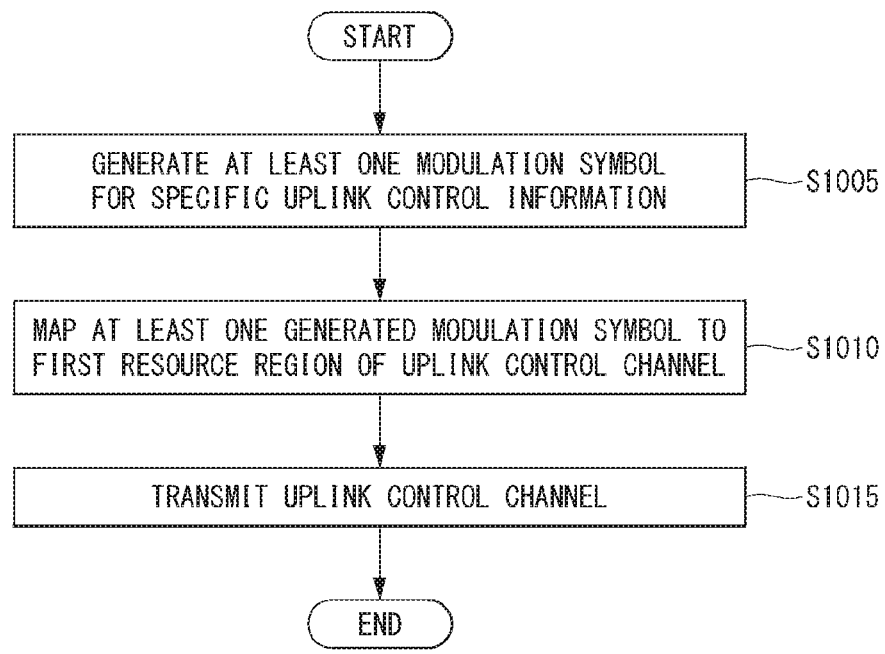
FIG. 10 illustrates an operation flowchart of a terminal transmitting an uplink control channel according to various embodiments of the present invention.

FIG. 10 illustrates an operation flowchart of a terminal (or user equipment) transmitting an uplink control channel according to various embodiments of the present invention. FIG. 10 is only for convenience of the description and does not limit the scope of the present invention.

Referring to FIG. 10, it is assumed that the UE transmits the uplink control information (e.g., ACK/NACK information) to the eNB (or base station) through the uplink control channel in the NR system.

In step S1005, the UE generates at least one modulation symbol for specific uplink control information. In this case, the UE may use the QPSK modulation scheme or the BPSK modulation scheme, as in the first, second, and third embodiments described above. At this time, when the UE uses the BPSK modulation scheme, at least one modulation symbol may include a first modulation symbol (e.g., 1) corresponding to a first bit of specific uplink control information (e.g., 2-bit ACK/NACK information) and a second modulation symbol (e.g., −1) corresponding to a second bit of the specific uplink control information.

In step S1010, the UE maps the generated at least one modulation symbol to first resource region of the uplink control channel. At this time, as described in the methods of the first, second, and third embodiments described above, the first resource region may mean the data RE(s) of the UL control channel. That is, the UE may map the modulation symbol for the uplink control information to the data RE(s). Specifically, a modulation symbol for uplink control information may be spreadly (i.e., repeatedly) mapped to a plurality of data Res or mapped to a specific data RE.

In this case, the reference signal may be mapped to RS RE (e.g., DMRS RE)(s) (i.e., second resource region), which is another part of the uplink control channel, as described above. In this case, in order to increase the detection or decoding performance of the uplink control information, an energy value allocated to a first resource region (i.e., the data region) and an energy value allocated to a second resource region (i.e., DMRS region) are configured to be equal to each other.

In particular, the energy value allocated to the first resource region and the energy value allocated to the second resource region may be determined by considering the chordal distance between the states (e.g., the first state and the second state) of the specific uplink control information. Here, the states may be determined according to a combination of the first control information and the second control information constituting the specific uplink control information. For example, when the specific uplink control information is 2-bit ACK/NACK information, the states may be determined according to a combination of [ACK] and [NACK]. Furthermore, the chordal distance may mean the chordal distance in the first embodiment, the second embodiment, and the third embodiment described above.

In addition, when the UE uses the BPSK modulation scheme, the first modulation symbol and the second modulation symbol to be generated may be mapped to the first resource region (i.e., data RE(s)) according to any one of the localized mapping or the distributed mapping, as in the method of the second embodiment described above. In this case, the UE may receive information (e.g., indicator) indicating the localized mapping or distributed mapping through the higher layer signaling and/or downlink control information (DCI).

Further, for the multiplexing between the UEs, the UE map to resource elements (REs) of the UL control channel by multiplying the sequence for the uplink control information and the reference signal (e.g., DMRS). In particular, as described in the method of the second embodiment, at least one modulation symbol and reference signal (e.g., DMRS) transmitted through the uplink control channel may be multiplied by at least one sequence of a sequence of a length corresponding to the number of first modulation symbols, a sequence of a length corresponding to the number of second modulation symbols, a sequence of a length corresponding to the number of resource elements configuring second resource region (i.e., the number of resource elements to which the reference signal is mapped), or a sequence of a length corresponding to a length of a basic unit of the uplink control channel. In this case, the sequence may include the Zadoff-Chu sequence, the orthogonal cover code (OCC), or the like.

General Apparatus to which the Present Invention may be Applied

Figure 11:
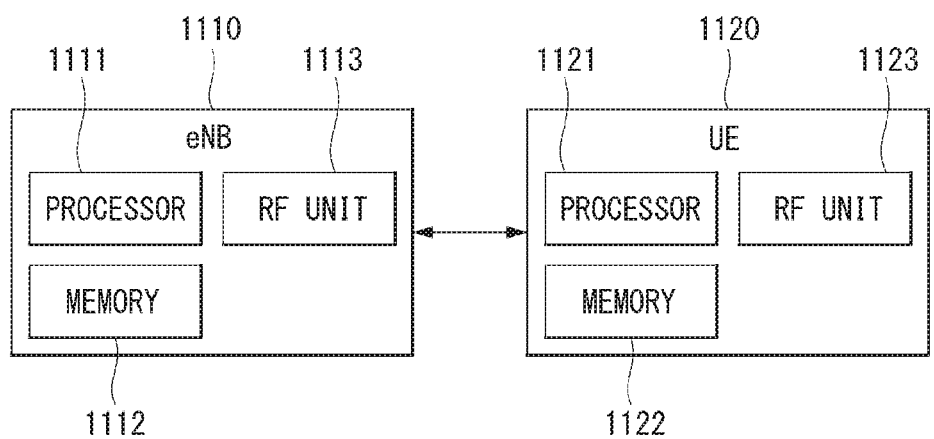
FIG. 11 illustrates a block diagram of a wireless communication device to which methods proposed in the present invention may be applied.

FIG. 11 illustrates a block diagram of a wireless communication apparatus to which the methods proposed in this specification may be applied.

Referring to FIG. 11, a wireless communication system includes an eNB 1110 and a plurality of UEs 1120 disposed within the eNB (1110) region.

The eNB 1110 includes a processor 1111, memory 1112 and a radio frequency (RF) unit 1113. The processor 1111 implements the functions, processes and/or methods proposed in FIGS. 1 to 10. The layers of a radio interface protocol may be implemented by the processor 1111. The memory 1112 is connected to the processor 1111, and stores a variety of types of information for driving the processor 1111. The RF unit 1113 is connected to the processor 1111 and transmits and/or receives radio signals.

The UE 1120 includes a processor 1121, memory 1122 and an RF unit 1123.

The processor 1121 implements the functions, processes and/or methods proposed in FIGS. 1 to 10. The layers of a radio interface protocol may be implemented by the processor 1121. The memory 1122 is connected to the processor 1121 and stores a variety of types of information for driving the processor 1121. The RF unit 1123 is connected to the processor 1121 and transmits and/or receives radio signals.

The memory 1112, 1122 may be positioned inside or outside the processor 1111, 1121 and may be connected to the processor 1111, 1121 by various well-known means.

For example, in a wireless communication system supporting low latency service, a UE may include a radio frequency (RF) unit for transmitting and receiving radio signals in order to transmit and receive downlink (DL) data and a processor functionally connected to the RF unit.

Furthermore, the eNB 1110 and/or the UE 1120 may have a single antenna or multiple antennas.

Figure 12:
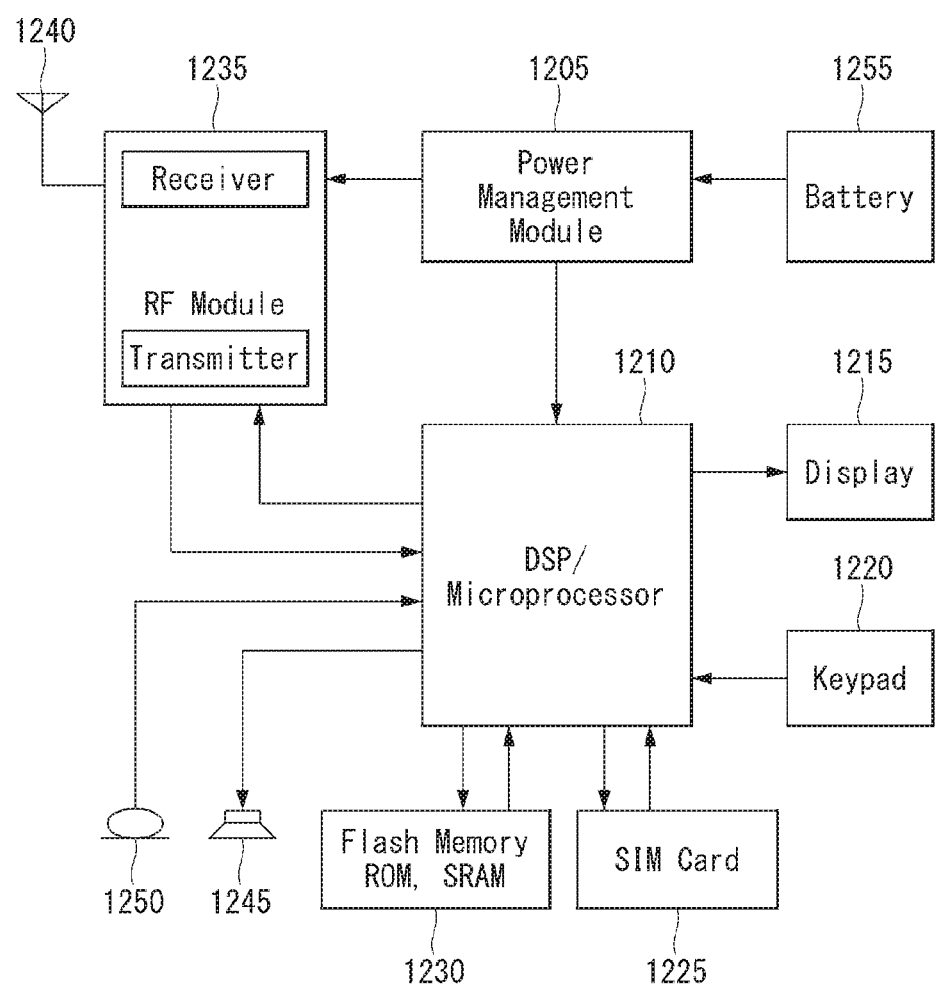
FIG. 12 illustrates a block diagram of a communication device according to an embodiment of the present invention.

FIG. 12 is a block diagram of a communication device according to an embodiment of the present disclosure.

Particularly, FIG. 12 is a diagram illustrating a UE shown in FIG. 11 in more detail.

Referring to FIG. 12, the UE includes a processor (or digital signal processor (DSP)) 1210, an RF module (or RF unit) 1235, a power management module 1205, an antenna 1240, a battery 1255, a display 1215, a keypad 1220, a memory 1230, a subscriber identification module (SIM) card 1225 (optional), a speaker 1245 and a microphone 1250. The UE may include a single antenna or multiple antennas.

The processor 1210 may be configured to implement the functions, procedures and/or methods proposed by the present disclosure as described in FIGS. 1 to 10. Layers of a wireless interface protocol may be implemented by the processor 1210.

The memory 1230 is connected to the processor 1210 and stores information related to operations of the processor 1210. The memory 1230 may be located inside or outside the processor and may be connected to the processors through various well-known means.

A user enters instructional information, such as a telephone number, for example, by pushing the buttons of a keypad 1220 or by voice activation using the microphone 1250. The processor receives and processes the instructional information to perform the appropriate function, such as to dial the telephone number. Operational data may be retrieved from the SIM card 1225 or the memory 1230 to perform the function. Furthermore, the processor may display the instructional and operational information on the display 1215 for the user's reference and convenience.

The RF module 1235 is connected to the processor and transmits and/or receives an RF signal. The processor forwards instructional information to the RF module, to initiate communication, for example, transmits radio signals comprising voice communication data. The RF module includes a receiver and a transmitter to receive and transmit radio signals. An antenna 1240 facilitates the transmission and reception of radio signals. Upon receiving radio signals, the RF module may forward and convert the signals to baseband frequency for processing by the processor. The processed signals may be transformed into audible or readable information outputted via the speaker 1245.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

Although a scheme of transmitting an uplink control channel in a wireless communication system of the present invention has been described with reference to an example applied to a 3GPP LTE/LTE-A system or a 5G system (New RAT system), the scheme may be applied to various wireless communication systems in addition to the 3GPP LTE/LTE-A system or 5G system.

What is claimed is:

1. A method for transmitting an uplink control channel in a wireless communication system, the method performed by a terminal comprising:
generating at least one modulation symbol for specific uplink control information;
mapping the at least one modulation symbol to a first resource region of the uplink control channel; and
transmitting the uplink control channel to a base station,
wherein the uplink control channel configured with the first resource region and a second resource region to which a reference signal is mapped,
wherein each the first resource region and the second resource region includes at least one resource elements,
wherein the first resource region and the second resource region are included in one physical resource block (PRB) in a frequency domain and are included in one symbol in a time domain,
wherein a sum of an energy value respectively allocated to the at least one resource elements included in the first resource region is configured to be the same as a sum of an energy value respectively allocated to the at least one resource elements included in the second resource region, and
wherein the energy value respectively allocated to the at least one resource elements included in the first resource region is configured to be different from the energy value respectively allocated to the at least one resource elements included in the second resource region.

2. The method of claim 1, wherein the at least one modulation symbol includes at least one modulation symbol generated according to quadrature phase shift keying (QPSK) modulation.

3. The method of claim 2, wherein the specific uplink control information is configured with first control information and second control information,
wherein the energy value allocated to the first resource region and the energy value allocated to the second resource region are determined by considering a chordal distance between a first state and a second state of the specific uplink control information, and
wherein the first state and the second state are determined respectively according to a combination of the first control information and the second control information.

4. The method of claim 3, wherein the chordal distance is defined according to Equation 14 below, $$\sqrt{1-|S(i)*S(j)^H|} \qquad \text{<Equation 14>}$$

where S(i) represents a sequence mapped to the first state and S(j) represents a sequence mapped to the second state.

5. The method of claim 3, wherein the specific uplink control information includes uplink ACK/NACK information.

6. The method of claim 1, wherein the at least one modulation symbol includes at least one modulation symbol generated according to binary phase shift keying (BPSK) modulation.

7. The method of claim 6, wherein the at least one modulation symbol includes a first modulation symbol corresponding to a first bit of the specific uplink control information and a second modulation symbol corresponding to a second bit of the specific uplink control information.

8. The method of claim 7, wherein the first modulation symbol and the second modulation symbol are mapped to the first resource region according to any one of localized mapping or distributed mapping.

9. The method of claim 8, further comprising:
receiving, from the base station, information indicating any one of the localized mapping or the distributed mapping, via at least one of higher layer signaling or downlink control information.

10. The method of claim 7, wherein the at least one modulation symbol and the reference signal is multiplied by at least one sequence of a sequence having a length corresponding to the number of first modulation symbols, a sequence having a length corresponding to the number of second modulation symbols, a sequence having a length corresponding to the number of the at least one resource elements configuring the second resource region, or a sequence having a length corresponding to the number of resource elements of the uplink control channel.

11. The method of claim 10, wherein the at least one sequence includes at least one of a Zadoff-Chu sequence or an orthogonal cover code.

12. A terminal for transmitting an uplink control channel in a wireless communication system, the terminal comprising:
a transceiving unit for transmitting and receiving a radio signal; and
a processor functionally connected to the transceiving unit,
wherein the processor is configured to:
generate at least one modulation symbol for specific uplink control information,
map the at least one modulation symbol to a first resource region of the uplink control channel, and
transmit the uplink control channel to a base station, and
wherein the uplink control channel includes the first resource region and a second resource region to which a reference signal is mapped,
wherein each the first resource region and the second resource region includes at least one resource elements,
wherein the first resource region and the second resource region are included in one physical resource block (PRB) in a frequency domain and are included in one symbol in a time domain,
wherein a sum of energy value respectively allocated to the at least one resource elements included in the first resource region is configured to be the same as a sum of energy value respectively allocated to the at least one resource elements included in the second resource region, and
wherein the energy value respectively allocated to the at least one resource elements included in the first resource region is configured to be different from the energy value respectively allocated to the at least one resource elements included in the second resource region.

13. The method of claim 1,
wherein the energy value respectively allocated to the at least one resource elements included in the first resource region is same for each other, and
wherein the energy value respectively allocated to the at least one resource elements included in the second resource region is same for each other.

14. The terminal of claim 12,
wherein the energy value respectively allocated to the at least one resource elements included in the first resource region is same for each other, and
wherein the energy value respectively allocated to the at least one resource elements included in the second resource region is same for each other.

* * * * *